United States Patent [19]

Berlin

[11] Patent Number: 5,691,921

[45] Date of Patent: Nov. 25, 1997

[54] THERMAL SENSORS ARRAYS USEFUL FOR MOTION TRACKING BY THERMAL GRADIENT DETECTION

[75] Inventor: Andrew A. Berlin, Palo Alto, Calif.

[73] Assignee: Xerox Corporation, Stamford, Conn.

[21] Appl. No.: 583,248

[22] Filed: Jan. 5, 1996

[51] Int. Cl.[6] .................................................. G01K 17/00
[52] U.S. Cl. .................... 364/557; 364/516; 271/3.01;
271/3.07; 271/10.12; 271/13; 271/15; 271/17;
271/227; 250/559.37; 250/559.07; 347/104;
347/215; 347/216; 347/217
[58] Field of Search ........................... 364/516, 557;
347/104, 215, 216, 217; 271/3.01, 3.07,
10.12, 13, 15, 17, 227; 250/559.37, 559.07

[56] References Cited

U.S. PATENT DOCUMENTS

| | | | |
|---|---|---|---|
| 3,682,554 | 8/1972 | Flaczynski | 356/167 |
| 4,662,756 | 5/1987 | Duran, Jr. | 356/429 |
| 4,662,757 | 5/1987 | Duran, Jr. | 356/429 |
| 4,777,368 | 10/1988 | Kerlin, Jr. | 250/341 |
| 4,867,054 | 9/1989 | Taylor | 100/93 RP |
| 4,891,088 | 1/1990 | Svyatsky | 156/350 |
| 5,021,673 | 6/1991 | Dragon et al. | 250/248 |
| 5,021,676 | 6/1991 | Dragon et al. | 250/561 |
| 5,120,976 | 6/1992 | Clayton et al. | 250/560 |

*Primary Examiner*—Emanuel T. Voeltz
*Assistant Examiner*—Hien Vo
*Attorney, Agent, or Firm*—Robert A. Burtzlaff

[57] ABSTRACT

An object tracking and motion control system includes a thermal marking unit such as a laser for inducing localized thermal indicia on objects. A thermal tracking unit, typically a micro electro mechanical system (MEMS) such as a two dimensional thermal sensing array, is positioned to measure movement of objects marked with localized thermal indicia. A motion control unit is connected to the thermal tracking unit to permit adjustment of motion of objects marked with induced localized thermal indicia based on their measured movement.

14 Claims, 4 Drawing Sheets

THERMAL SENSORS ARRAYS USEFUL FOR MOTION TRACKING BY THERMAL GRADIENT DETECTION

FIELD OF THE INVENTION

The present invention relates to thermal tracking of moving objects. More specifically, the present invention relates to determination of position, velocity, or orientation of an object through detection of a thermal gradient on the object by a micro electrical mechanical system (MEMS) thermal sensor array.

BACKGROUND AND SUMMARY OF THE INVENTION

A material processing system must often precisely control position and velocity of objects moving through the system. Commonly, material processing systems control object movement by physically engaging the object with a separate object drive mechanism moving at a predetermined velocity along a predetermined path. For example, gear driven ratchets, rollers, hooks, or conveyors are widely employed to move objects as diverse as paper, semiconductors, plastics, or steel by mechanically engaging the objects, and moving the engaged objects along a desired path at a fixed velocity. While commonplace, mechanical or frictional engagement of objects does have a disadvantage of requiring direct physical contact with an object. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper. As another example, the possibility of contaminating high purity silicon wafers moving along a processing line is greatly increased by the use of high speed mechanical arms or grippers.

Fortunately, mechanical or frictional engagement is only one possible means for moving an object. Object drive mechanisms based on fluid support, electrostatic, or electromagnetic systems have all been employed to move objects with requiring solid mechanical contact. For example, electromagnetic flotation systems can be used to move ferroelectric materials without physically contacting a ferroelectric object. More commonly, material processing systems that rely on some form of fluid support are used, with object entrainment in liquids, bubble flotation methods, support on a laminar air flows, or support by directed air jets all being used to lift and propel objects through a materials processing system.

In contrast to mechanical engagement systems that hold objects in spaced apart relationship at predefined and discrete distances, exact determination of object position for non-mechanically engaged object drive mechanisms is much more difficult. Typically, a separate position and velocity sensor system is required. This can be a mechanical sensor, such as a lightweight ball roller that is situated in revolving contact with a moving object, or a non-contacting sensor such as an object edge detecting laser or video tracking camera. Unfortunately, available mechanical sensor systems are difficult to use on levitated objects, still increase the risk of contamination, and are often fragile and difficult to calibrate. In addition, even lightly contacting roller bearings, lever arms, or other mechanical devices can unfavorably alter the dynamic behavior of the object. Finally, such mechanical sensors are often overly sensitive to changes in object topology and surface properties, making consistent measurements difficult.

Optical position/velocity measurement systems do not have the limitations of mechanical systems, but do have their own distinct disadvantages. For example, a laser emitter/light detector combination that measures object position as a function of light blockage as an object's edge passes between the laser and its corresponding light detector may greatly reduce the risk of contamination as compared to mechanical sensors, but can be expensive and require an inordinate number of separate sensor/detector pairs to track three dimensional movements. Video tracking camera systems are similarly expensive, and may require substantial image processing to detect object features and reliably determine position and velocity.

The disadvantages of commonly available optical detector systems is most apparent when position and velocity of a fast moving, delicate, and visually featureless material is required. Examples of such materials include continuous rolls of paper, extruded plastics, metallic foils, wires, or optical fibers. Absent externally applied marking indicia (inks, dyes, or physical perforations such as holes), edge tracking or optical systems will only be able to determine lateral position and velocity transverse to the direction of motion, and not velocity in the direction of process motion. This problem does not completely disappear even if the featureless material is not continuous, but instead consists of discrete units such as sheets of paper or disks of semiconductor wafer material. Although the gross velocity of featureless material can generally be determined with edge detection methods, rotations, slight misalignments, or other orientation problems can still be difficult to quickly detect and provide suitable movement compensation without application of undesirable markings to an otherwise featureless object.

Accordingly, the present invention provides an apparatus and method for tracking velocity and position of objects that does not require physically contacting or permanently marking the tracked object. Furthermore, the present invention does not rely on edge or feature detection to determine object velocity, position, or orientation, and can easily work with either continuous or discrete objects moving through a materials processing system. In addition, the present invention does not require permanent physical alteration of the object, such as by deposition of patterned inks, cut grooves or lines in the object, or punched holes through the object. The present invention is an object tracking and motion control system that includes a thermal sensing unit having a plurality of thermal sensors for measuring movement of objects, and a motion control unit connected to the thermal sensing unit for adjusting motion of objects based on their measured movement.

In preferred embodiments, a thermal marking unit positioned near the thermal sensing unit can also be provided to induce selective temperature gradients on objects at predetermined, localized region or subregions of the object. The thermal marking unit may include a directable heat source configured to elevate the temperature of a localized region on an object. This directable heat source can be a laser emitting coherent optical or infrared radiation, or may alternatively be a non-coherent radiative heat source such as provided by electrical heating of metals. For those applications permitting transfer of small amounts of force to an object, direct jets of either heated or cooled gas may be used, depending upon whether a positive or negative induced temperature gradient is needed. In certain applications it is even possible to lightly contact an object with a heated or cooled probe to provide transient temperature modifications. Touching an object with a probe is particularly useful for conductive cooling of a localized spot on an object, and may be enabled with a "cold finger" in contact with an open or closed circuit evaporative cooler or Peltier effect device.

Operation of thermal marking can be continuous or intermittent, depending on the desired shape of the induced temperature gradient. Typically, stable continuous operation provides a temperature gradient centered on a line directed in the direction of object movement. When only temperature sensors having a coarse temporal resolution (i.e. unable to quickly measure changing temperatures) are available, the linear temperature gradient induced by a continuous thermal marker is easily detectable and provides useful information concerning the travel path and two dimensional rotational orientation of an object.

For those situations where high temporal resolution temperature sensors are available, intermittent, pulsed, or periodic operation of the thermal marking unit is possible. Pulsed or periodic operation may include both discrete thermal marking (e.g. short heat bursts applied every tenth of a second) or amplitude modulated heat application (e.g. a continuous heat source having its available directed thermal energy sinusoidally varied). Advantageously, multiple intermittent, pulsed or periodic thermal marking allows accurate determination of object position and velocity, and in appropriate circumstances can allow determination of the two or three dimensional orientation of the object. As will be appreciated, such information generally requires high speed thermal scans, or better yet, two dimensional temperature sensor arrays for best operation.

For example, a laser can be used to heat a plurality of localized regions of an object. The time required for the movement of the heated regions to adjacent temperature sensors of the thermal tracking unit is inversely proportional to the speed of the object, assuming of course that the object's velocity is substantially constant. Instantaneous velocity can be determined if two dimensional temperature gradient information is available. Using temperature information from each sensor (which individually detects a temperature in a subregion of each heated, localized region of the object), a temperature gradient can be calculated. Since the shape of the gradient varies according to object velocity, the speed and direction of movement of the object can be determined. Further, since a temperature centroid based on a two dimensional temperature gradient information derived from subregion temperatures can be derived, a highly accurate object position can be calculated. Further, if the object is multiply marked with thermal indicia, orientation information derived from the temperature centroid is determinable, and even rotational speed of the object can be calculated.

Upon determination of position, velocity, and orientation information, the motion control unit for adjusting motion of objects can use this information to correct for object misalignments, incorrect speed or travel path, or even object pitch, roll, and yaw (if three dimensional orientation information is available). In a most preferred embodiment of the present invention, paper or other graphically markable material is among the objects capable of being thermally marked and tracked in accordance with the present invention. High speed movement of paper can be enabled by use of independently adjustable mechanical movers such as differential rollers, or more advantageously, with air jets that support and move paper through a paper processing system such as a xerographic apparatus, laser printer, or electrostatic ink jet printer. The paper handling system includes a thermal marking unit (typically an infrared laser) for inducing a localized temperature gradient on a region of paper moving through the paper handling system. A thermal sensing unit (typically a two dimensional thermal sensing array, constructed using conventional micro electro mechanical systems (MEMS) technology) is positioned adjacent to the thermal marking unit, with the thermal sensing unit being configured to measure a plurality of localized subregion object temperatures over the region of paper having the induced localized temperature gradient. A paper movement calculating module is connected to the thermal tracking unit, with the paper movement calculating module determining paper movement relative to the MEMS type thermal sensing unit based on determination of a centroid of the induced localized temperature gradient. In response to the calculated position and velocity, a paper motion control unit connected to the paper movement calculating module is used to modify paper movement (for example, by selectively increasing or decreasing velocity of air jets impacting defined regions of the paper) to nearly instantaneously correct for paper misalignments.

Additional functions, objects, advantages, and features of the present invention will become apparent from consideration of the following description and drawings of preferred embodiments.

DETAILED DESCRIPTION OF THE INVENTION

Figure 1:
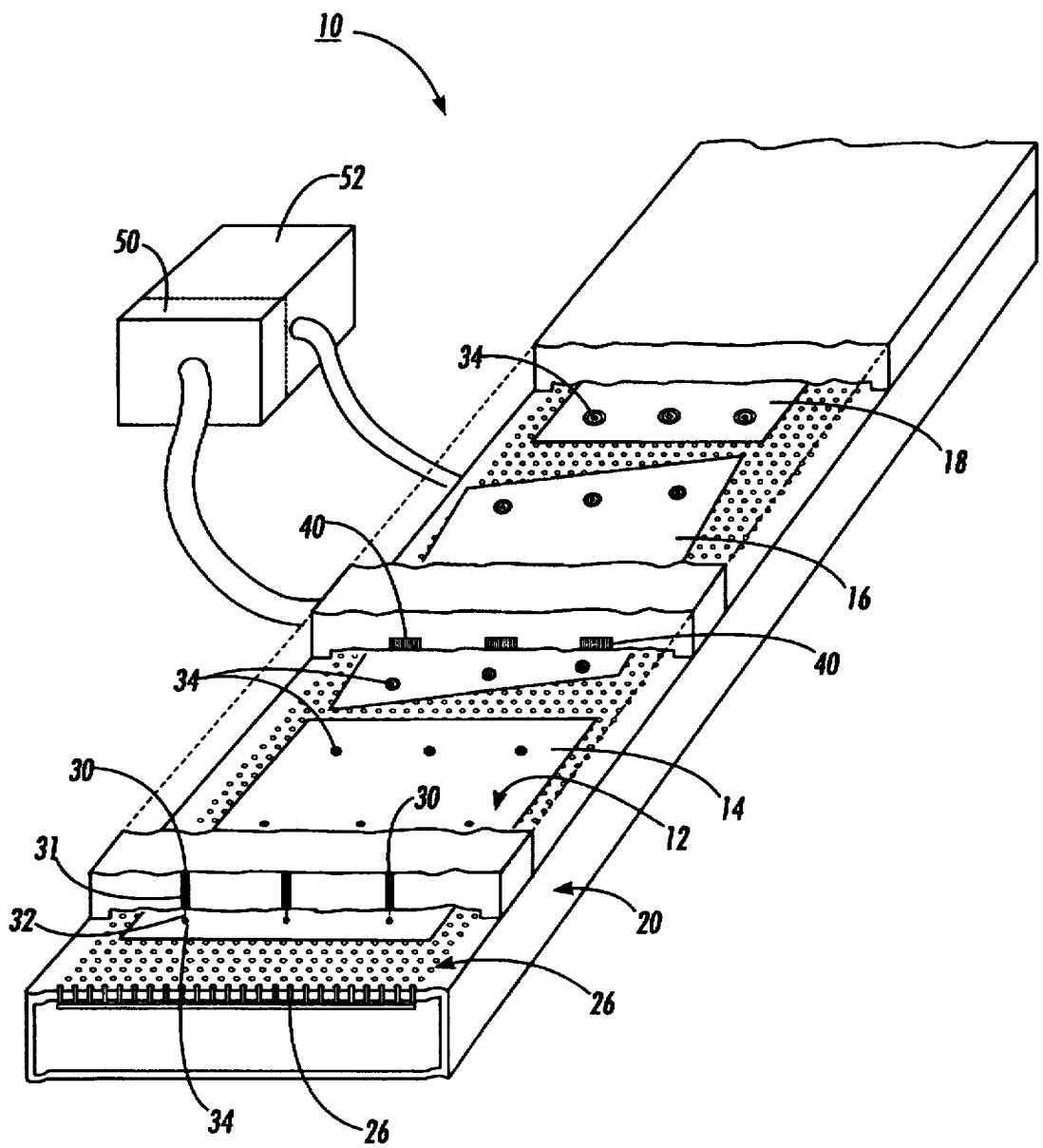
FIG. 1 illustrates a paper handling system for accurately moving air jet supported papers at high speeds, with lasers utilized to mark paper with thermal indicia, thermal sensor arrays used to detect the thermal indicia, and a movement control unit connected to the infrared sensor arrays to determine paper movement and provide appropriate corrective input to air jets to maintain a paper on a desired path, velocity, and orientation.

A processing system 10 optimized for handling objects without requiring direct physical contact, including sheets of paper 12, is partially illustrated in FIG. 1. The processing system 10 has a conveyor 20 that includes a plurality of air jets 26 for supporting, moving, and guiding paper 12 through the system 10. Active object guidance is enhanced by provision of a thermal marking unit 30, typically an infrared laser 31. The laser 31 is capable of directing a laser beam 32 to induce a localized temperature gradient 34 on a region of paper 12. A thermal sensing unit 40, typically positioned adjacent to the thermal marking unit 30 (within a few meters, or often within a few centimeters) is used to measure object temperatures over the region of paper 12 having the induced localized temperature gradient 34, and pass this temperature information to a temperature analysis unit 50 capable of calculating movement of paper 12, including its position and velocity, relative to the thermal sensing unit 40. Using this calculated movement information, a motion control unit 52 connected to the temperature analysis unit sends control signals to modify movement of paper 12.

In operation, use of a thermal sensing unit 40 for feedback control of object movement allows for precise micromanipulation of object position. For example, in FIG. 1 paper 12 is sequentially illustrated in three distinct positions along conveyor 20, respectively labelled as paper position 14, paper position 16, and paper position 18. In position 14, the paper 12 is thermally marked by laser 31. As paper 12 is moved along conveyor 20 toward position 16 by air jets 26, it becomes slightly misaligned (note, the severity of misalignment is greatly exaggerated in the Figure). The sensor 40 provides a spatial measurement of the temperature of the region of paper 12 passing beneath it, and passes the information to the temperature analysis unit 50. The temperature analysis unit 50 uses the temperature information (i.e. the sensor measured temperature gradient in one, two, or three dimensions) to accurately determine position of the thermal marking (and consequently the paper 12). This positional information is passed to the motion control unit 52, which sends signals to selected air jets 26 to correct the misalignment, bringing the paper 12 back into an aligned position 18, ready for further processing by system 10.

Advantageously, the present invention allows for thermal tracking, manipulation and control of a wide variety of objects and processes. Note that the description of the present invention in conjunction with air jet conveyer 20 is for illustrative purposes only, and in suitable circumstances the conveyor 20 can be replaced by belts, friction drives, slides, chutes, mechanical grippers, vacuum attachment mechanisms, or any other conventional conveyor or drive mechanism. In addition to paper handling, other articles of manufacture, including those composed of plastics, ceramics, metals, wood, or any other conventional material, can be thermally tracked according to the present invention. Thermal tracking can also be employed to control movement of processing machinery. For example, belts or rollers of xerographic copiers or other machinery having moving parts can be transiently marked with thermal indicia, the thermal indicia being thermally tracked to ensure proper speed, position, or rotational velocity of the moving parts.

As will be appreciated by those skilled in the art, although the present invention can be used with ordinary irregular articles capable of being visually or mechanically distinguished by appropriate imaging/identification systems, the present invention is of particular utility in conjunction with processes that require precise high speed movement of delicate and visually featureless material. To maintain purity, quality, or consistency, such materials are often unsuited for marking with conventional marking indicia such as inks, dyes, or physical cuts, notches or perforations. Examples of such materials include rolls or sheets of paper, extruded plastics, metallic foils, wires, silicon wafers, high quality ceramics or machined parts, or even optical fibers. The present invention permits ready detection and correction of rotations, slight misalignments, or other orientation problems that can be difficult to quickly detect and provide suitable movement compensation for without application of undesirable markings to an otherwise featureless object.

In order to ascertain object position properly, the thermal sensing unit 40 must be reliable and accurate, having a spatial, thermal, and temporal resolution sufficient for thermal tracking of a relatively small area (typically less than one square centimeter) at less than about $1/10$ of a degree Celsius temperature gradient intervals. To prevent thermal damage to materials, relatively low temperature elevations of a region of an object, typically in the range of 10 to 100 degrees Celsius over ambient (ambient taken as about 20 degrees Celsius), are used. For particularly delicate materials or for high precision applications, even smaller temperature gradients may be employed. For example, if sinusoidal heat is applied to an object, temperature elevations as small as $1/100$ of a degree Celsius may be detected after conventional signal processing techniques are used to filter out low frequency temperature changes.

In many processes the object is moving quickly, allowing less than a 100 milliseconds for thermal measurements. Fortunately, infrared sensors such as a micro electro mechanical thermal sensors (MEMS-type sensors), thermocouples, temperature sensitive diodes, pyroelectric devices, or certain other conventional thermal detectors are capable of providing suitable spatial, thermal, and temporal resolutions. For best results, two dimensional sensor arrays or scanned one dimensional temperature arrays are utilized, however, fixed one dimensional sensor arrays can also be used, especially if only coarse resolution in either the thermal or temporal domain is required.

Figure 2:
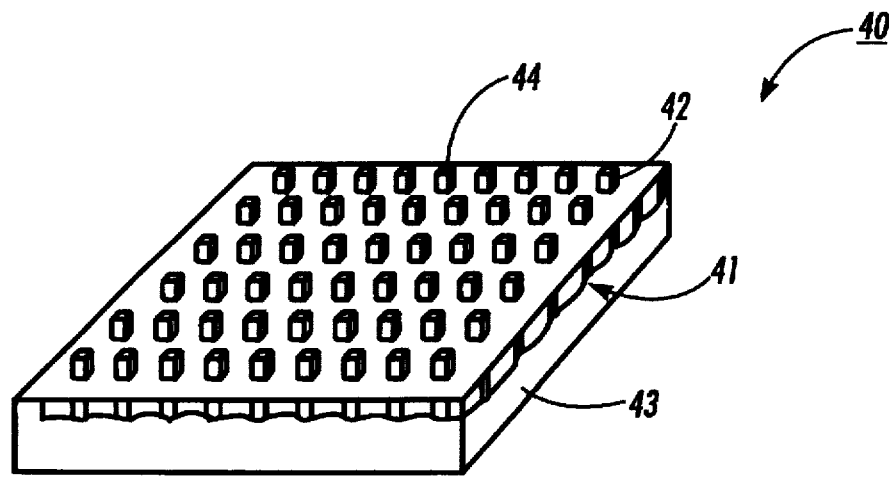
FIG. 2 is an blown up view of a portion of a thermal sensor array, illustrating a plurality of upwardly extending arms, each supporting an infrared sensor.
Figure 3:
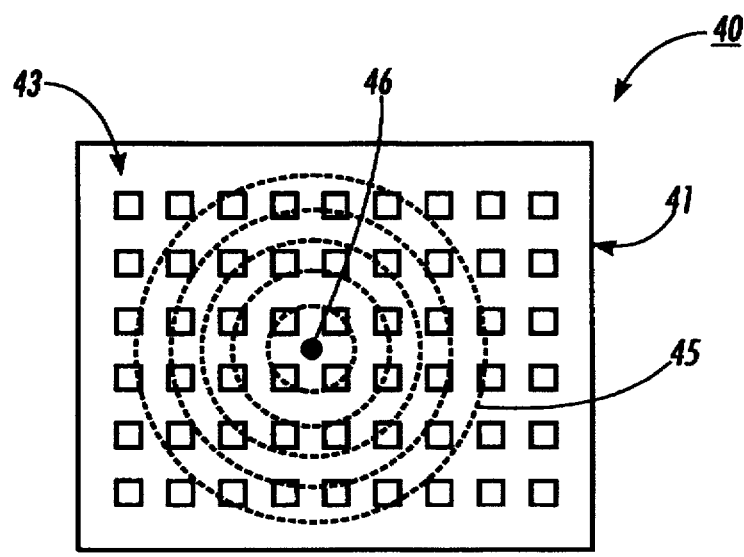
FIG. 3 is an exemplary view of the thermal sensor array of FIG. 2, with isotemperature detection lines superimposed.

In a preferred embodiment of the present invention, illustrated with reference to FIGS. 2 and 3, the thermal sensing unit 40 is a two dimensional MEMS-type sensor array 41. The sensor array 41 includes a substrate 43, typically silicon, that may be coated with single or multiple layers of doped silicon, polysilicon, silicon nitride, silicon, silicon oxide, oxynitride, or aluminum. A plurality of upwardly extending arms 42 that provide thermal isolation and enhance spatial resolution of the array 41 are attached to the substrate 43, with each arm 42 terminating in a thermally sensitive diode 44. Typically, a sensor array 41 will have overall dimensions between about one millimeter square to about one centimeter square, with anywhere from about 100 to 100,000 separate arms being used to support thermally sensitive diodes. In a most preferred embodiment, overall dimensions of between about 1 millimeter and 1 centimeter, with between about 100 to 100,000 thermally sensitive diodes being sufficient for measurement of temperature gradients with a desired spatial resolution.

Various conventional construction techniques can be used to build the MEMS-type sensor array 41, including chemical etching, electron beam lithography, photolithography, or other standard integrated circuit batch processing technologies. As will be appreciated, various MEMS-type thermal sensor designs can be used to practice the present invention. For example, material surrounding each arm 42 can be selectively etched away, except for a defined pivot attachment, and the arms electrostatically maneuvered (by rotation upward) and locked into the shown position. Alternatively, the material surrounding an arm already oriented in an upright position can simply be etched away. In other MEMS-type thermal sensor embodiments, not illustrated, thermal isolation of thermally sensitive diodes can be achieved by emplacement of diodes in wells, or surrounding the diodes with partitions.

No matter which MEMS-type sensor is utilized, for best results in thermal tracking each diode 44 must be attached by provided data lines (not illustrated) to the temperature analysis unit 50 to allow calculation of thermal gradients. To better appreciate operation of the present invention, FIG. 3 illustrates temperature isogradient lines 45 for sensor array 41. Once isogradient lines 45 are determined, a temperature centroid 46 can be calculated. Presumably, the apparent position of the calculated centroid 46 closely approximates the initial position of a region of an object (such as paper 12) that is thermally marked at a spot with, for example, laser 31. By tracking position of the centroid 45, the relative movement of the object between the initial thermal marking and the present position of the object can be estimated. In practice, even relatively crude experimental sensor systems (with consequent crude centroid determinations) have been found to allow determination of object position with sub-centimeter precision. Higher density sensor arrays will accordingly allow even better tracking of objects with submillimeter accuracy.

Figure 4:
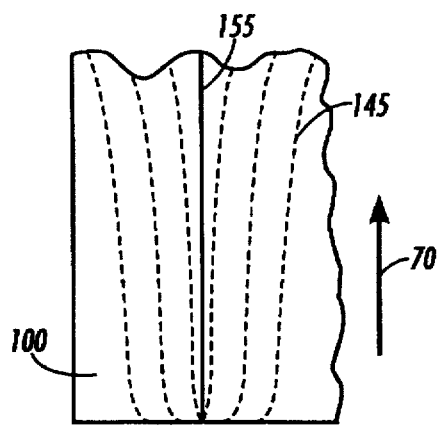
FIG. 4 is an exemplary view of a portion of a featureless object continuously marked with thermal indicia, with the isotemperature thermal gradient illustrated in dotted lines.

To better appreciate various aspects of possible thermal tracking schemes using the present invention, FIGS. 4–7 are provided to illustrate isotemperature gradients on object 100. FIG. 4 illustrates an isotemperature gradient 145 in response to continuous application of heat as object 100 linearly passes in direction 70 under a heat source (not shown). As can be seen by inspection of FIG. 4, lateral or two dimensional rotational orientation of object 100 can readily be determined by calculation of the center line 155 of the temperature gradient. If the isotemperature gradient is sufficiently detailed, as shown in FIG. 4, it may even be possible to determine speed of object 100, based on the extent of broadening of the temperature gradient 145 as the object 100 moves away from the heat source and normally cools.

Figure 5:
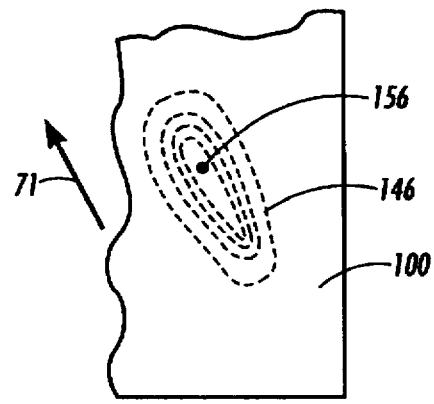
FIG. 5 is an exemplary view of a portion of an object intermittently marked with thermal indicia, so that detection of the illustrated isotemperature thermal gradient permits determination of object position and velocity.

Similarly, FIG. 5 illustrates the isotemperature gradient 146 in response to intermittent application of a heat spot (for example by a laser, not shown) as object 100 linearly passes in direction 71. As can be seen by inspection of FIG. 5, the two dimensional position of object 100 can readily be determined by calculation of centroid 156 of the temperature gradient. Again, it is possible to determine velocity of object 100, based on the direction and extent of broadening of the temperature gradient 146 as the object 100 moves away from the heat source and cools.

Figure 6:
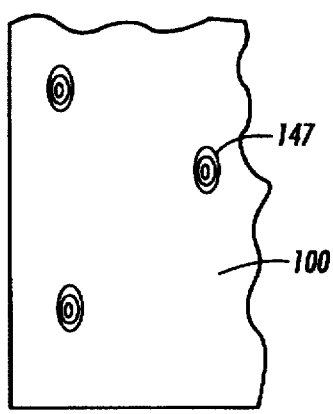
FIG. 6 is an exemplary view of an object intermittently marked with multiple thermal indicia to permit calculation of the object's two dimensional position, orientation, and velocity.
Figure 7:
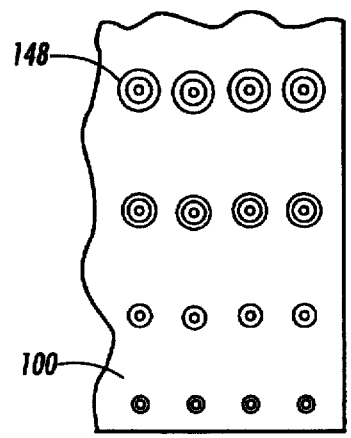
FIG. 7 is an exemplary view of an object periodically marked with thermal indicia.
Figure 8:
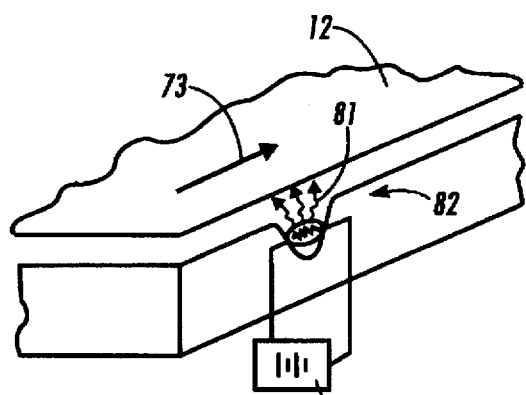
FIG. 8 is a schematic view of an object marked with thermal indicia by a non-coherent radiative heat source.

FIGS. 6 and 7 illustrate possible thermal tracking schemes using multiple spaced apart thermal markings 147 and 148. The use of multiple thermal markings, in conjunction with multiple thermal sensors (not shown), improves accuracy of calculating object position, velocity, and orientation. FIG. 7 illustrates application of periodic temperature pulses at discrete intervals to an object 100 to allow for accurate velocity determination.

As will be appreciated, many possible devices can be used to induce measurable temperature gradients in an object. For example, FIGS. 8–11 illustrate a few possible methods for heating paper 12 in addition to laser heating (heating via coherent radiation) as previously discussed in relation to FIG. 1. For continuous heating, a resistance element 82 connected to an electrical power source 80 can be used to provide a low cost and relatively steady source of radiative thermal energy to paper 12 moving in direction 73. Use of this resistance element 82 for heating an object would be expected to yield a isotemperature gradient qualitatively similar to that indicated in FIG. 4.

Figure 9:
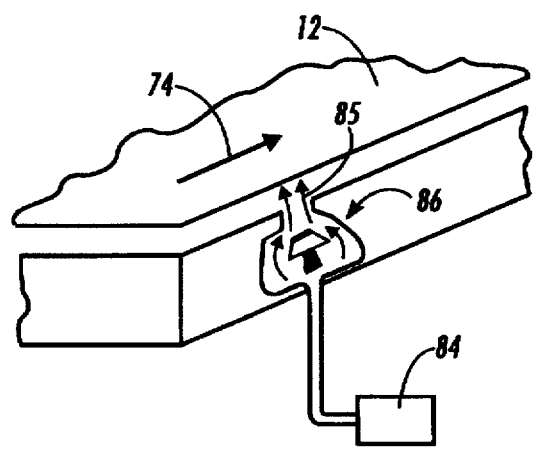
FIG. 9 is a schematic view of an object marked with thermal indicia by a heated jet of air.

Another contemplated thermal heating device is illustrated by FIG. 9. Relying on heated jets of air 85 released by operation of valve 86 and heated air reservoir 84, instead of radiative heating, permits quick response and intermittent operation. Similarly quick intermittent response is also possible with the device illustrated in FIG. 11. As shown, FIG. 11 uses cooling jets of air 93 released by operation of valve 92 and cooled air reservoir 90 to induce a negative thermal gradient on paper 12 moving in direction 76.

Figure 10:
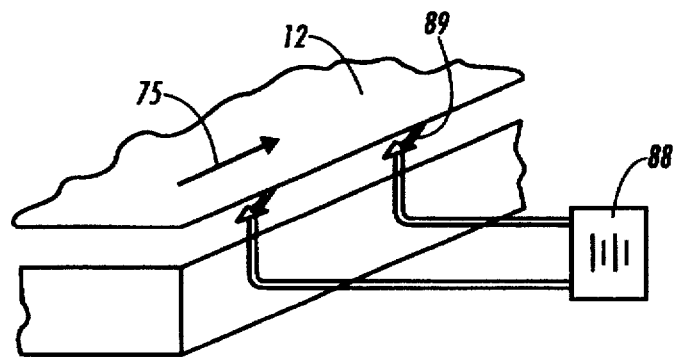
FIG. 10 is a schematic view of an object marked with thermal indicia by continuous physical contact with a heated probe.
Figure 11:
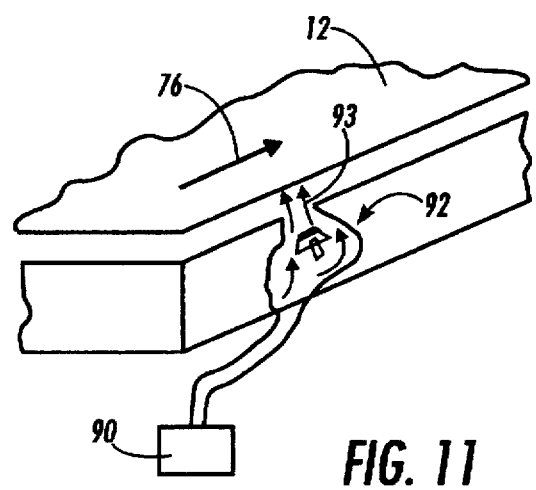
FIG. 11 is a schematic view of an object marked with thermal indicia by a jet of cooled air.

For certain applications, direct contact with an object for conductive heating or cooling may be used. FIG. 10 illustrates use of a ceramic probe 89 containing resistive elements that can be electrically heated and placed into thermal contact with paper 12. If intermittent, rather than continuous, heating operation is desired the probe 89 can be mechanically withdrawn from contact with paper.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. An object tracking and motion control system comprising
   a thermal sensing unit having a plurality of temperature sensors for measuring a plurality of temperatures over localized regions of objects having thermal gradients, wherein the plurality of temperature sensors of the thermal sensing unit are arranged to form a two dimensional temperature sensing array, with the two dimensional temperature sensing array allowing calculation of a temperature centroid based on two dimensional temperature gradient information derived from subregion temperatures of objects,
   a movement calculation unit connected to the thermal sensing unit to determine movement of the object based on the temperature centroid, and
   a motion control unit connected to the movement calculation unit, the motion control unit configured to modify motion of objects in response to movement information received from the movement calculation unit.

2. The object tracking and motion control system of claim 1, further comprising a thermal marking unit for inducing a localized thermal gradient on objects.

3. The object tracking and motion control system of claim 2, wherein the thermal marking unit further comprises a directable heat source configured to elevate temperature of a localized region on an object.

4. The object tracking and motion control system of claim 2, wherein the directable heat source for elevating temperature of the localized region on the object further comprises a laser.

5. The object tracking and motion control system of claim 2, wherein the directable heat source for elevating temperature of the localized region on the object further comprises a directed jet of heated gas.

6. The object tracking and motion control system of claim 1, wherein the thermal marking unit further comprises a coolant configured to reduce temperature of a localized region on an object.

7. The object tracking and motion control system of claim 6, wherein the coolant configured to reduce temperature of the localized region on the object further comprises a directed jet of gas coolant.

8. The object tracking and motion control system of claim 1, wherein the thermal marking unit for inducing localized thermal indicia on objects is intermittently operated.

9. The object tracking and motion control system of claim 1, wherein the thermal marking unit for inducing localized thermal indicia on objects is continuously operated.

10. An object tracking and motion control system comprising a thermal sensing unit having a plurality of temperature sensors arranged to form a two dimensional temperature sensing array, with the two dimensional temperature sensing array allowing calculation of a temperature centroid based on two dimensional temperature gradient information derived from subregion temperatures of objects, wherein the two dimensional temperature sensing array of the thermal sensing unit further comprises a plurality of arms for providing thermal isolation, each arm having a thermally sensitive diode attached, a movement calculation unit connected to the thermal sensing unit to determine movement of the object based on the calculated temperature centroid, and a motion control unit connected to the movement calculation unit, the motion control unit configured to modify motion of objects in response to movement information received from the movement calculation unit.

11. The object tracking and motion control system of claim 10, further comprising between about 100 to about 100,000 arms with attached thermally sensitive diodes.

12. The object tracking and motion control system of claim 1, wherein objects moved by the motion control unit consist essentially of paper.

13. An object tracking system comprising a thermal sensing unit having a plurality of temperature sensors for measuring a plurality of temperatures over localized regions of an object, a thermal marking unit for cooling localized regions of the object, and a temperature centroid calculation unit connected to the thermal sensing unit to determine movement of the object based on a centroid of a temperature gradient derived from temperature measurements by the plurality of temperature sensors of thermal gradients of localized regions on the object.

14. The object tracking system of claim 13, wherein the thermal marking unit cools the object with a directed jet of gas.

* * * * *